United States Patent
Chang et al.

(10) Patent No.: US 8,619,673 B2
(45) Date of Patent: Dec. 31, 2013

(54) PREAMBLE PARTITION AND CELL IDENTIFICATION PROCEDURE IN WIRELESS COMMUNICATION SYSTEMS

(75) Inventors: Yu-Hao Chang, Daya Township, Taichung County (TW); Yih-Shen Chen, Hsinchu (TW); Pei-Kai Liao, Nantou County (TW)

(73) Assignee: Mediatek Inc. (TW)

( * ) Notice: Subject to any disclaimer, the term of this patent is extended or adjusted under 35 U.S.C. 154(b) by 441 days.

(21) Appl. No.: 12/803,832

(22) Filed: Jul. 6, 2010

(65) Prior Publication Data

US 2011/0007690 A1    Jan. 13, 2011

Related U.S. Application Data (60) Provisional application No. 61/223,743, filed on Jul. 8, 2009, provisional application No. 61/229,823, filed on Jul. 30, 2009.

(51) Int. Cl.
*H04W 4/00* (2009.01)
*H04W 36/00* (2009.01)

(52) U.S. Cl.
USPC .......... 370/328; 370/350; 370/441; 370/509; 455/442; 455/443; 455/444; 455/449

(58) Field of Classification Search
USPC ......... 370/328, 324, 331, 337, 342, 350, 441, 370/471, 476, 491, 503, 509–514; 455/434, 455/435.2, 436, 439, 442–444, 449, 525; 340/3.21
See application file for complete search history.

(56) References Cited

U.S. PATENT DOCUMENTS

| | | | | |
|---|---|---|---|---|
| 7,289,483 | B1* | 10/2007 | Lim | 370/342 |
| 2008/0186949 | A1* | 8/2008 | Hafeez et al. | 370/350 |
| 2009/0131098 | A1* | 5/2009 | Khandekar et al. | 455/525 |
| 2010/0226322 | A1* | 9/2010 | Choi et al. | 370/329 |

(Continued)

FOREIGN PATENT DOCUMENTS

| | | |
|---|---|---|
| JP | 2009089186 | 4/2009 |
| JP | 2010541488 | 12/2010 |

(Continued)

OTHER PUBLICATIONS

"IEEE 802.16m System Description Document [Drafty}"; Hamiti; May 31, 2009; pp. 1-183; IEEE 802.16m-08/003r9a.*

(Continued)

*Primary Examiner* — Benjamin H Elliott, IV
(74) *Attorney, Agent, or Firm* — Zheng Jin (57) ABSTRACT

Two preamble partition schemes are provided for flexible network deployment and efficient utilization of limited cell identification resources in a wireless network. In a soft partition scheme, the entire preamble sequences are partitioned into several configurable non-overlapping subsets, and each subset is associated with a corresponding cell type. In a hybrid partition scheme, a combination of fixed and configurable subsets is used for preamble partition. The partitioning information is carried in a broadcasting channel broadcasted from base stations to mobile stations. In one embodiment, after a mobile station performs scanning and synchronization with a first base station, it derives the cell type of the first base station from cell identification and partitioning information. The mobile station completes ranging and network entry with the first base station if the cell type is preferred, and starts to perform scanning and synchronization with a second base station if the cell type is non-preferred.

17 Claims, 5 Drawing Sheets

(56) References Cited

U.S. PATENT DOCUMENTS

2010/0291925 A1    11/2010   Nagata et al. .................. 455/434
2011/0007690 A1*    1/2011   Chang et al. .................. 370/328
2011/0129008 A1     6/2011   Chmiel et al. ................. 375/224

FOREIGN PATENT DOCUMENTS

| JP | 2011513887 | 4/2011 |
| JP | 2011525738 | 9/2011 |
| WO | WO2009045969 | 4/2009 |
| WO | WO2009114780 | 9/2009 |

OTHER PUBLICATIONS

"Proposed Text of Advanced Preamble for the IEEE 802.16m Amendment"; Xiu et al.; May 1, 2009; pp. 1-27; IEEE C80216m-09/1134.doc.*

The Japanese Patent Office, Office Action of Japanese patent application 2012-518743 dated Mar. 19, 2013 (7 pages).

R1-082584, Nokia Siemens Networks, Nokia, "Proposed Response to LS on CSG Cell Identification (R2-082899)", 3GPP TSG RAN WG1 #53bis Meeting, Warsaw, Poland, Jun. 30-Jul. 4, 2008 (2 pages).

* cited by examiner

PREAMBLE PARTITION AND CELL IDENTIFICATION PROCEDURE IN WIRELESS COMMUNICATION SYSTEMS

CROSS REFERENCE TO RELATED APPLICATIONS

This application claims priority under 35 U.S.C. §119 from U.S. Provisional Application No. 61/223,743, entitled "Cell Identification in Wireless Communication Systems," filed on Jul. 8, 2009; U.S. Provisional Application No. 61/229,823, entitled "Preamble Partition in Advanced Wireless Communication Systems," filed on Jul. 30, 2009; the subject matter of which is incorporated herein by reference.

TECHNICAL FIELD

The disclosed embodiments relate generally to wireless network communications, and, more particularly, to cell identification partition and network entry procedure in wireless communication systems.

BACKGROUND

In wireless communication systems, such as defined by IEEE 802.16 specification, base stations and mobile stations communicate with each other by sending and receiving data carried in a series of superframes. Before a mobile station can access a base station, physical (PHY) layer synchronization and Media Access Control (MAC) layer synchronization are performed. Upon power-on, a mobile station first acquires downlink (DL) PHY layer synchronization and adjusts its timing, frequency and power via synchronization channel (SCH) broadcasted by a serving base station. After DL PHY layer synchronization, the mobile station acquires uplink (UL) PHY layer synchronization via ranging procedures and MAC layer synchronization via network entry procedures with the serving base station.

A synchronization channel (SCH) is a radio resource region within each superframe that is used for preamble transmission by base stations. A preamble is a predefined code sequence used to facilitate network synchronization. In current IEEE 802.16m wireless systems, a hierarchical two-stage synchronization scheme has been proposed. In a first stage of primary synchronization channel (P-SCH), a primary advanced-preamble (PA-Preamble) is used to provide coarse timing synchronization. In a second stage of secondary synchronization channel (S-SCH), multiple secondary advanced-preambles (SA-Preambles) are used to provide fine timing synchronization and cell identification (ID) detection.

In next generation wireless networks, heterogeneous network deployment is required to fulfill diversified service requirements. As a result, different cell types such as macro-cells, microcells, picocells, and femtocells will coexist in the same wireless network. Because a mobile station may prefer only a certain cell type to become its serving base station, the mobile station needs to be able to identify the cell type it camps on as soon as possible. There are various methods in providing cell type information of base stations in a wireless communication system. In one example, each base station may directly broadcast its own cell type information to mobile stations via a broadcasting channel (BCH). While this method is easy for identifying cell type information, long re-camping time is highly possible when the cell type is not preferred by a mobile station. This is because the mobile station has to decode the BCH and obtain cell type information after performing DL PHY layer synchronization during re-camping.

In another example, SA-Preambles are partitioned into several fixed non-overlapping subsets and each subset is associated with a corresponding cell type. Cell type information thus can be inferred based on the partitioning information of SA-Preambles because each cell ID is associated with an SA-Preamble. This method is also referred to as cell ID hard partition. Under the hard partition method, the partitioning information is independent from different network deployment scenarios because the partitioned subsets are predefined and known to all mobile stations. Therefore, the hard partition method requires no signaling overhead and introduces no extra network entry latency in providing the partitioning information. Such hard partition method, however, cannot adapt to different network environment where different numbers of cell types are needed. The hard partition method thus loses cell ID efficiency and is difficult for cell planning.

It remains a challenge to design a cell ID partition scheme that provides flexible network deployment and efficient utilization of limited cell ID resources with short re-camping time.

SUMMARY

Two cell identification (ID) partition schemes are provided for flexible network deployment and efficient utilization of limited cell ID resources in a wireless network. In a soft partition scheme, the entire preamble sequences are partitioned into several configurable non-overlapping subsets, and each subset is associated with a corresponding cell type. The partitioning information is carried through a broadcasting channel (BCH) broadcasted from base stations to mobile stations. In one example, partition pointers are used to indicate the partitioning information. Under the soft partition scheme, the number of partitions and the size of each partition are flexible depending on system deployment. Each partition size can be adjusted to different environment to achieve the best efficiency and easy cell planning.

In a hybrid partition scheme, a combination of fixed and configurable subsets is used for preamble partition. The entire preamble sequences are first partitioned into two fixed sets (i.e., hard partition), a first set allocated for a first cell type, and a second set allocated for the rest of the cell types. The preamble sequences allocated for the second set are further partitioned into several configurable non-overlapping subsets (i.e., soft partition), each of which belongs to a different cell type. The hybrid partition scheme combines the advantage of both hard and soft partition and is friendly to different deployment scenarios with low signaling burden.

In one embodiment, a mobile station first performs scanning and synchronization with a first base station upon power-on. By decoding an SCH and a BCH broadcasted by the first base station, the mobile station detects the cell ID of the first base station as well as cell ID partitioning information. Based on the detected information, the mobile station identifies the cell type of the first base station and determines whether the cell type is preferred. If the cell type is the one that the mobile station intends to camp on, then the mobile station completes ranging and network entry procedure with the first base station. On the other hand, if the cell type is not the mobile station intends to camp on, then the mobile station starts to perform scanning and synchronization with a second base station. When the mobile station scans for DL channels for re-camping, it simply search for base stations whose cell IDs belong to the cell type that the mobile station intends to camp on. That is, the cell searching time for re-camping can be largely reduced.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
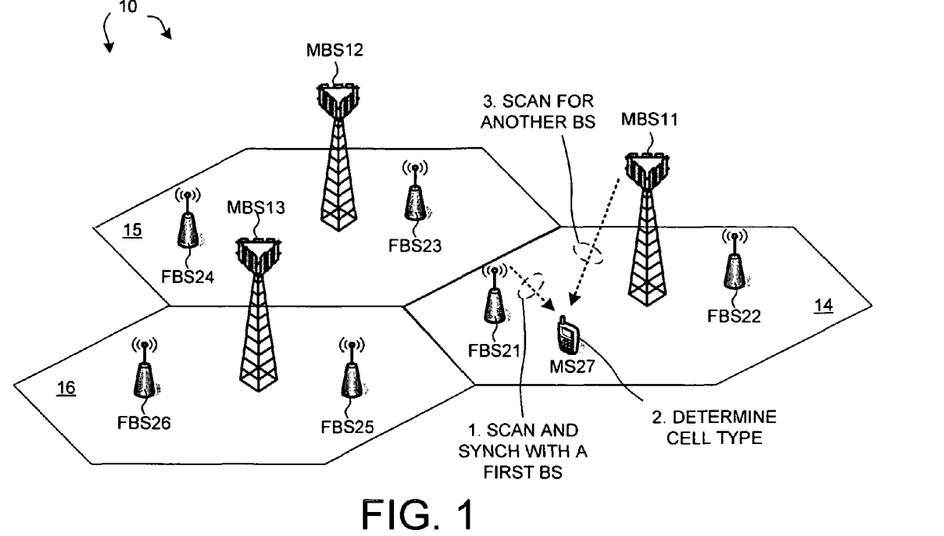
FIG. 1 illustrates a wireless communication system in accordance with one novel aspect.

FIG. 1 illustrates a wireless communication system 10 in accordance with one novel aspect. Wireless communication system 10 comprises a plurality of macro base stations MBS11-MBS13 serving a plurality of cells 14-16 respectively, and a plurality of femto base stations FBS21-FBS26 located within the cell coverage of the macro base stations. Upon power-on, a mobile station MS27 receives radio signals transmitted from the macro base stations as well as the femto base stations. MS27 scans for downlink (DL) channels and performs DL physical synchronization with a target base station. Typically, if MS27 receives the strongest radio signals from a particular base station (i.e., from FBS21), then MS27 selects that base station as the target base station. In one novel aspect, MS27 identifies the cell type (i.e., femtocell) of the target base station and determines if the cell type is the one that MS27 intends to camp on. If the cell type is preferred by MS27, then MS27 completes ranging and network entry procedure and establishes data connection with the target base station (i.e., target base station FBS21 becomes the serving base station). On the other hand, if the cell type is not preferred by MS27, then MS27 goes back to scan for other DL channels provided by other base stations (i.e., MBS11).

In IEEE 802.16m wireless communication systems, base stations and mobile stations communicate with each other by sending and receiving data carried in a series of superframes. A mobile station first acquires DL physical synchronization via a synchronization channel (SCH) broadcasted by a base station. An SCH is a radio resource region within each superframe that is used for preamble sequence transmission by base stations. In a hierarchical SCH design, an SCH includes a Primary SCH (P-SCH) for carrying PA-Preambles used for coarse timing and frequency synchronization, and a Secondary SCH (S-SCH) for carrying SA-Preambles used for fine synchronization and cell identification (ID) detection. Based on the received preamble sequences, the mobile station is able to obtain reliable reference signals in both time and frequency domain for DL synchronization. The mobile station is also able to detect the cell ID of the broadcasting base station. In addition to the SCH, the mobile station acquires critical system information via a broadcast channel (BCH) broadcasted by the base station. A BCH is a radio resource region within each superframe that is used for broadcasting additional information by base stations. In one example, a network-entry-related BCH (also referred as BCH type-1) is conveyed either in a format of a superframe header (SFH) defend in IEEE 802.16m wireless systems, or in a format of a master information block or system information block (MIB/SIB) defined in WCDMA/LTE wireless systems. In another example, an extended BCH (also referred as BCH type-2) is conveyed in a format of a media-access-control (MAC) layer management message (e.g., a system configuration descriptor (SCD)) defined in IEEE 802.16m wireless systems.

In one novel aspect, cell type information is provided based on configurable cell ID partition schemes. SA-Preambles are partitioned into several configurable non-overlapping subsets, each of which belongs to different cell types. The SA-Preamble partitioning information is indicated via a BCH broadcasted from base stations to mobile stations. Thus, cell type information can be inferred based on the SA-Preamble partitioning information because each cell ID is associated with a SA-Preamble. By providing configurable cell ID partition, more flexible network deployment and efficient utilization of limited cell ID resources are achieved. In addition, mobile station re-camping time may also be reduced with low overhead and signaling burden. More details of providing cell type information based on different configurable cell ID partition schemes are now described below with accompanying drawings.

Figure 2:
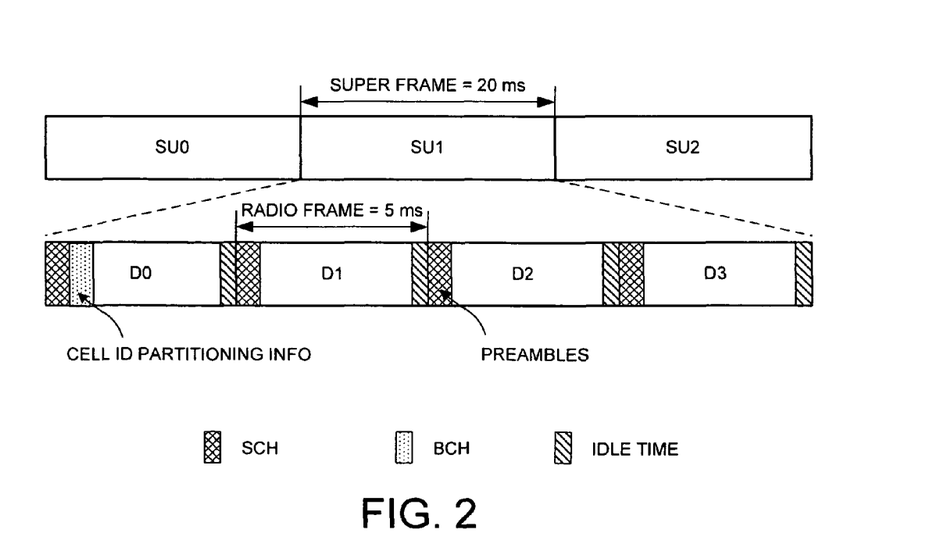
FIG. 2 is a diagram that illustrates an overview of providing cell identification partitioning information via a broadcast channel (BCH).

FIG. 2 is a diagram that illustrates an overview of providing cell ID partitioning information via a broadcast channel (BCH) in accordance with one novel aspect. In the example of FIG. 2, base stations and mobile stations communicate with each other by sending and receiving radio signals carried via radio resource blocks in superframe structure. Each DL superframe (e.g., SU0, SU1, or SU2) contains four DL radio frames (e.g., D0, D1, D2, and D3). In one example, each superframe has a time length of twenty mille seconds, and each radio frame has a time length of five mille seconds. As illustrated in FIG. 2, an SCH is allocated within each DL superframe used for preamble transmission to facilitate DL-synchronization. In addition to the SCH, a BCH is also allocated within each DL superframe to provide cell ID partitioning information.

There are two basic types of configurable cell ID partition schemes, the first scheme is referred as soft partition and the second scheme is referred as hybrid partition. In a soft partition scheme, the entire SA-Preambles are partitioned into several non-overlapping subsets, and the number of the partitioned subsets as well as the size of each subset is indicated in the BCH. Under the soft partition scheme, the number of partitions and the size of each partition are flexible depending on system deployment. Each partition size can be adjusted to different environment to achieve the best efficiency and easy cell planning. However, signaling overhead increases as the number of partitions grows due to limited BCH bandwidth. In addition, longer network entry delay is possible because the mobile stations need to resort to BCH to update the partitioning information.

Figure 3A:
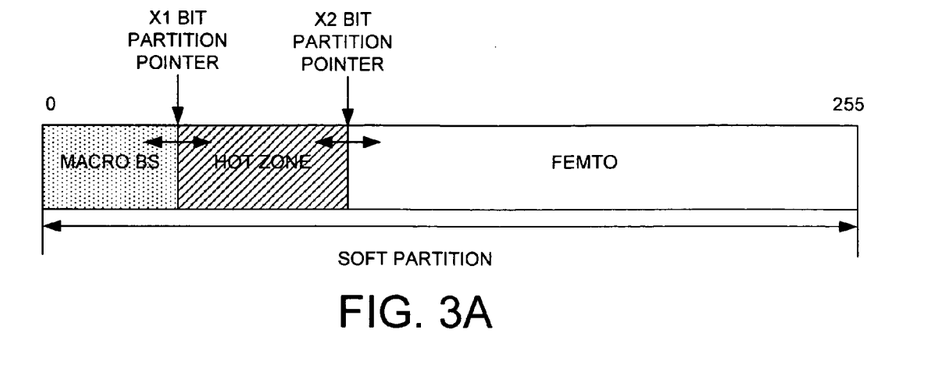
FIGS. 3A to 3C illustrate different embodiments of soft partition of cell identification in a wireless communication system.
Figure 3B:
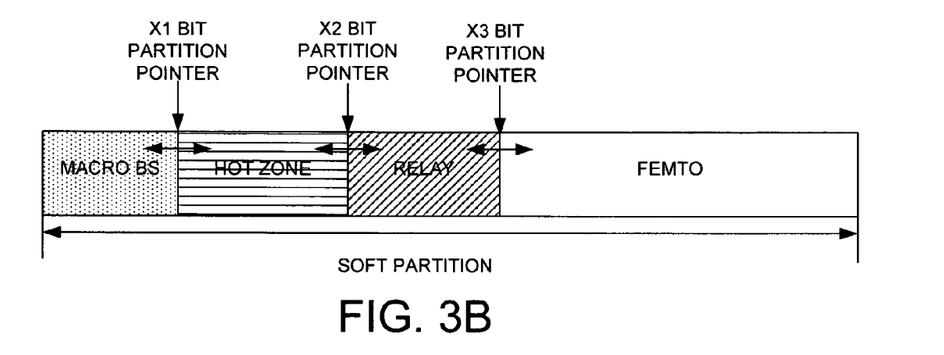
Figure 3C:
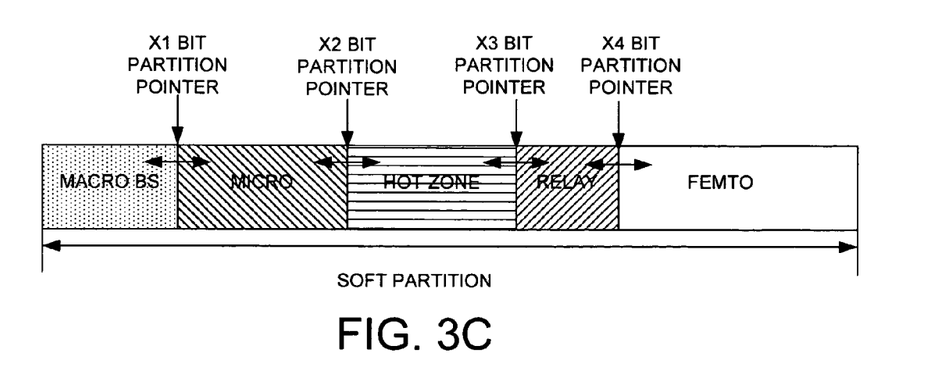

FIGS. 3A to 3C illustrate different embodiments of soft cell ID partition in a wireless communication system. In FIG. 3A, cell IDs for macrocell, hotzone, and femtocell are partitioned into three configurable subsets. In one embodiment, two partition pointers (one X1-bit and one X2-bit) are used to indicate the size of macrocell, hotzone and femtocell. Overall, total of (X1+X2) bits are required to indicate the partitioning information. The partitioning information is carried in BCH broadcasted from base stations to mobile stations.

For example, two 3-bit partition pointers (total of 6 bits) are used to partition the entire SA-Preambles range from 0 to 255, and the signaling range of each pointer is 0 to 7. In one implementation, the size of macrocell (N_macro) can be determined by the value of the first pointer, i.e. N_macro=50+($1^{st}$_pointer_value−4)*3, where 50 is the default size for macrocell and 3 is the granularity of preamble size change in Macro region. Similarly, the size of femtocell N_femto can be determined by the value of the second pointer, i.e., N_femto=30+($2^{nd}$_pointer_value−4)*4, where 30 is the default size for femtocell and 4 is the granularity of preamble size change in Femto region. Once N_macro and N_femto are determined, the size of hotzone (N_hotzone) can also be determined, i.e., N_hotzone=256−N_macro−N_femto. In another implementation, the size of macrocell (N_macro) is first determined by the value of the first pointer, i.e. N_macro=256*($1^{st}$_pointer_value/8). The size of hotzone (N_hotzone) is then determined by the values of the first and the second pointers, i.e., N_hotzone=256*(1−$1^{st}$_pointer_value/8)*($2^{nd}$_pointer_value/8), with floor, ceil, or rounding operation if necessary. Finally, the size of femtocell (N_femto) is determined, i.e., N_femto=256−N_macro−N_hotzone.

In FIG. 3B, cell IDs for macrocell, hotzone, relay, and femtocell are partitioned into four configurable subsets. The cell ID partitioning information is indicated by BCH. In one embodiment, three partition pointers (one X1-bit, one X2-bit, and one X3-bit) are used to indicate the size of macrocell, hotzone, relay and femtocell. Similarly, in FIG. 3c, cell IDs for macrocell, microcell, hotzone, relay, and femtocell are partitioned into five configurable subsets. The cell ID partitioning information is indicated by BCH. In one embodiment, four partition pointers (one X1-bit, one X2-bit, one X3-bit, and one X4-bit) are used to indicate the size of macrocell, microcell, hotzone, relay and femtocell. It is noted that the number of partition pointers varies depending on system deployment, and the size of each partition is easily adjustable by the pointer values. Moreover, additional flexibility may be achieved by adjusting the partition granularity using different signaling range of the partition pointers. It is also noted that the partitioning information in the examples of FIGS. 3A-3C can be carried by type-1 BCH only, thus the partition does not affect the network entry procedure.

In a hybrid partition scheme, a combination of hard partition and soft partition is used. The entire SA-Preamble sequences are first partitioned into two fixed sets, a first set allocated for a first cell type, and a second set allocated for the rest of the cell types. The SA-Preamble sequences for the second set are further partitioned into several configurable non-overlapping subsets, each of which belongs to a different cell type. The size of each fixed set is known in advance (i.e., pre-defined in system specification), while the size of each configurable subset is indicated in BCH. For example, IEEE 802.16m specifications predefines that a number of SA-Preamble sequences are dedicated for macrocells and the rest SA-Preamble sequences are dedicated for non-macrocells. Among the non-macrocells, the SA-Preamble sequences are further partitioned into non-overlapping subsets, and the size of each subset is configurable and indicated by BCH. The above-described hybrid partition scheme combines the advantage of both hard and soft partition and is friendly to different deployment scenarios with low signaling burden.

Figure 4A:
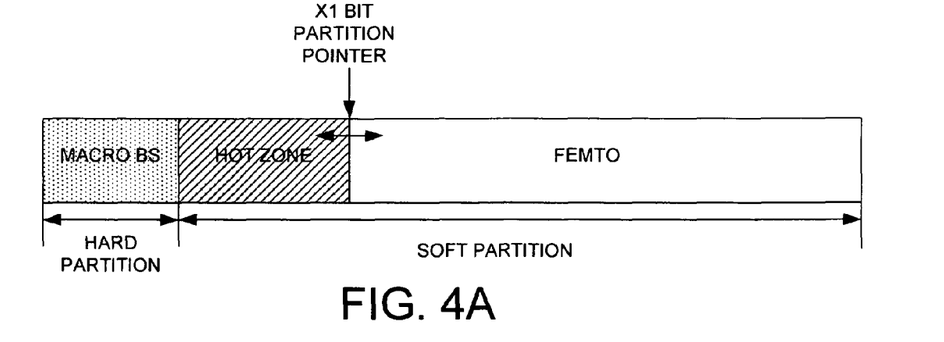
FIGS. 4A to 4C illustrate different embodiments of hybrid partition of cell identification in a wireless communication system.
Figure 4B:
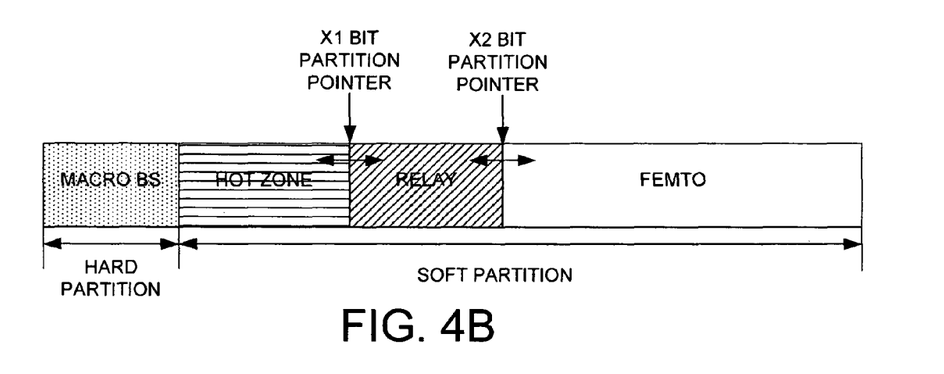
Figure 4C:
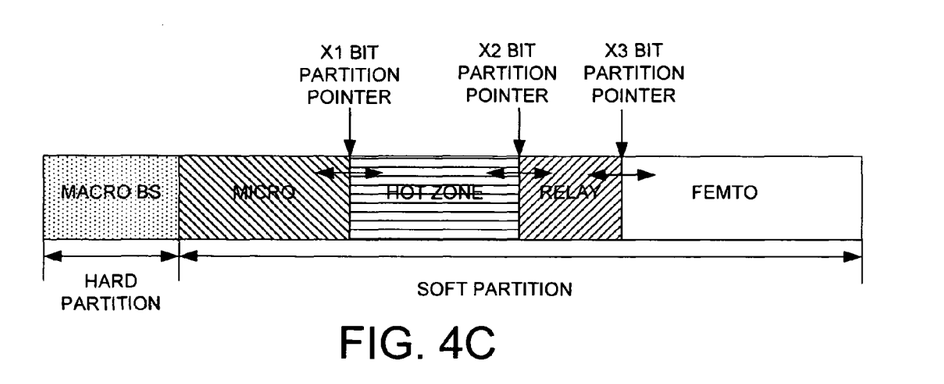

FIGS. 4A to 4C illustrate different embodiments of hybrid cell ID partition in a wireless communication system. In FIG. 4A, cell IDs for macrocells and non-macrocells are first partitioned to two fixed sets (hard partition). Cell IDs for non-macrocells are further partitioned into two configurable subsets (soft partition), one for hotzone and the other for femtocell. The cell ID partitioning information is indicated by BCH. In one embodiment, an X1-bit partition pointer can be used to indicate the size of the hotzone and femtocell. For example, using a 2-bit partition pointer, a value of "01" indicates that 25% of non-macrocell cell IDs are allocated for hotzone and 75% cell IDs are allocated for femtocell. Similarly, a value of "10" indicates that 50% of non-macrocell cell IDs are allocated for hotzone and the other 50% cell IDs are allocated for femtocell.

In the example of FIG. 4B, cell IDs for macrocells and non-macrocells are first partitioned to two fixed subsets (hard partition). Cell IDs for non-macrocells are further partitioned into three configurable subsets (soft partition), one for hotzone, one for relay, and one for femtocell. The cell ID partitioning information is indicated by BCH. In one embodiment, two partition pointers can be used to indicate the size of the hotzone, relay, and femtocell. For example, an X1-bit partition pointer can be used to adjust the size of hotzone subset, and another X2-bit partition pointer can be used to adjust the size of relay subset.

In the example of FIG. 4C, cell IDs for macrocells and non-macrocells are first partitioned to two fixed subsets (hard partition). Cell IDs for non-macrocells are further partitioned into four configurable subsets (soft partition), one for microcell, one for hotzone, one for relay, and one for femtocell. The cell ID partitioning information is indicated by BCH. In one embodiment, three partition pointers can be used to indicate the size of the microcell, hotzone, relay, and femtocell. For example, an X1-bit partition pointer can be used to adjust the size of microcell, an X2-bit partition pointer can be used to adjust the size of hotzone subset, and another X3-bit partition pointer can be used to adjust the size of relay subset. It is noted that hybrid partition reduces signaling overhead because less partition pointers are used to indicate the partitioning information as compared to soft partition, while deployment flexibility and cell ID efficiency are maintained.

In one particular embodiment defined by IEEE 802.16m specification, 768 SA-Preamble sequences are used for cell IDs. The cell types are categorized into macrocell and non-macrocell by hard partition with 258 sequences dedicated for macrocells and 510 sequences dedicated for non-macrocells. The non-macrocell partitioning information is broadcasted in a hierarchical structure, which composes of Secondary Super Frame Header (S-SFH) and AAI system configuration descriptor (SCD). The non-macrocell sequences are first partitioned into Closed Subscriber Group (CGS) femtocell and non-CGS femtocell. This first level partitioning information is indicated by S-SFH (SP3) via type-1 BCH. The CGS femtocell is further partitioned into CGS open or CGS close, and the non-CGS femtocell is further partitioned into hotzone or public femtocell. This second level partitioning information is indicated by an SCD message via type-2 BCH.

Figure 5:
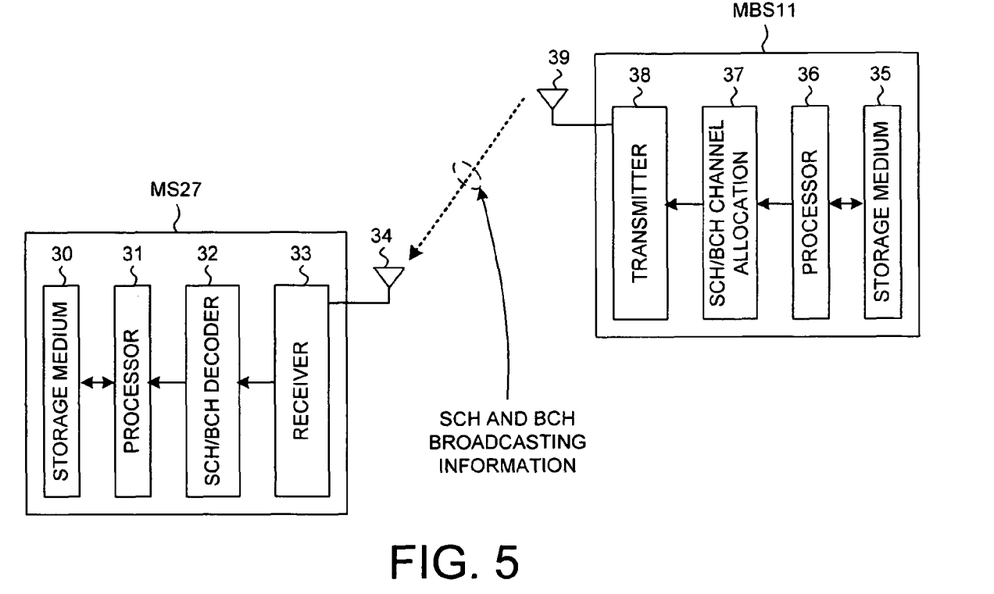
FIG. 5 is a simplified block diagram of a base station and a mobile station transmitting and receiving cell identification partitioning information.

FIG. 5 is a simplified block diagram of a macro base station MBS11 and a mobile station MS27 transmitting and receiving cell ID partitioning information. MBS11 comprises storage medium 35, a processor 36, a synchronization channel (SCH) and broadcast channel (BCH) allocation module 37, a radio frequency (RF) transmitter 38, and an antenna 39 that is coupled to RF transmitter 38. Similarly, MS27 comprises storage medium 30, a processor 31, a synchronization channel (SCH) and broadcast channel (BCH) decoding module 32, a radio frequency (RF) receiver 33, and an antenna 34 that is coupled to RF receiver 33. At the base station transmitting side, SCH and BCH allocation module 37 maps preamble code sequences and cell ID partitioning information onto an SCH and a BCH. At the mobile station receiving side, SCH and BCH decoding module 32 decodes the SCH and the BCH and derives cell ID and cell ID partitioning information.

Figure 6:
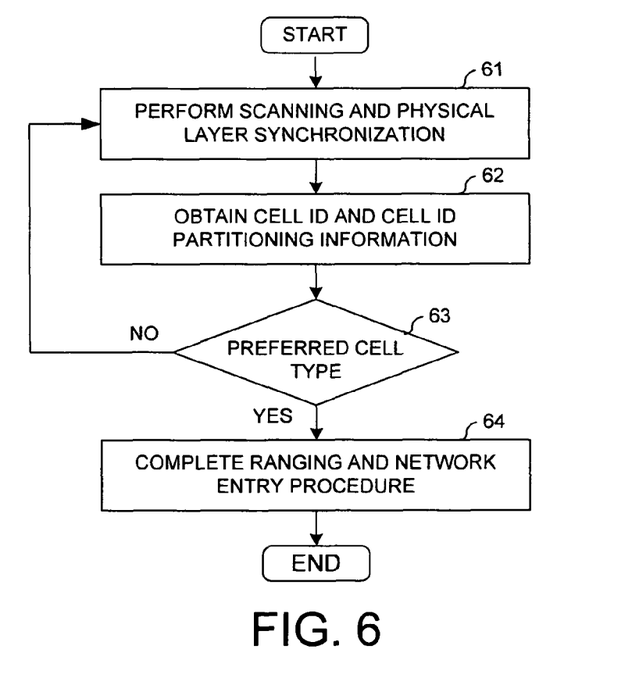
FIG. 6 is a simplified flow chart of mobile station initialization procedure in accordance with one novel aspect.

FIG. 6 is a simplified flow chart of a mobile station initialization procedure in accordance with one novel aspect. Upon power on, the mobile station performs scanning and physical layer synchronization with a target base station (step 61). By decoding an SCH and a BCH broadcasted by the target base station, the mobile station detects the cell ID of the target base station as well as cell ID partitioning information (step 62). Based on the detected information, the mobile station identifies the cell type of the target base station and determines whether the cell type is preferred (step 63). If yes, then the mobile station completes ranging and network entry procedure (step 64). If not, then the mobile station goes back to step 61.

In next generation wireless systems, heterogeneous network deployment is required to fulfill diversified service requirements. As a result, different cell types such as macrocell, microcell, picocell, and femtocell coexist in the same wireless network. Consequently, a mobile station may prefer to access only a specific cell type and thus needs to be able to identify the cell type it camps on as soon as possible. For example, when a mobile station camps on a CGS femtocell that it is not authorized to access, the mobile station needs to identify the cell type and start to search for another base station. When the mobile station goes back to step 61 and scans for other DL channels, it can simply search for base stations whose cell IDs belong to the cell type that the mobile station intends to camp on. That is, the cell searching time for re-camping can be largely reduced because the mobile station no longer needs to obtain cell ID partitioning information during re-camping. Moreover, under frequency reuse (i.e., FR=3), if a BS having a first cell type uses a first subband for preamble transmission and the MS does not intend to access the first cell type, then the MS may use only the second or third subband to scan and search for preambles transmitted by other BSs.

Figure 7:
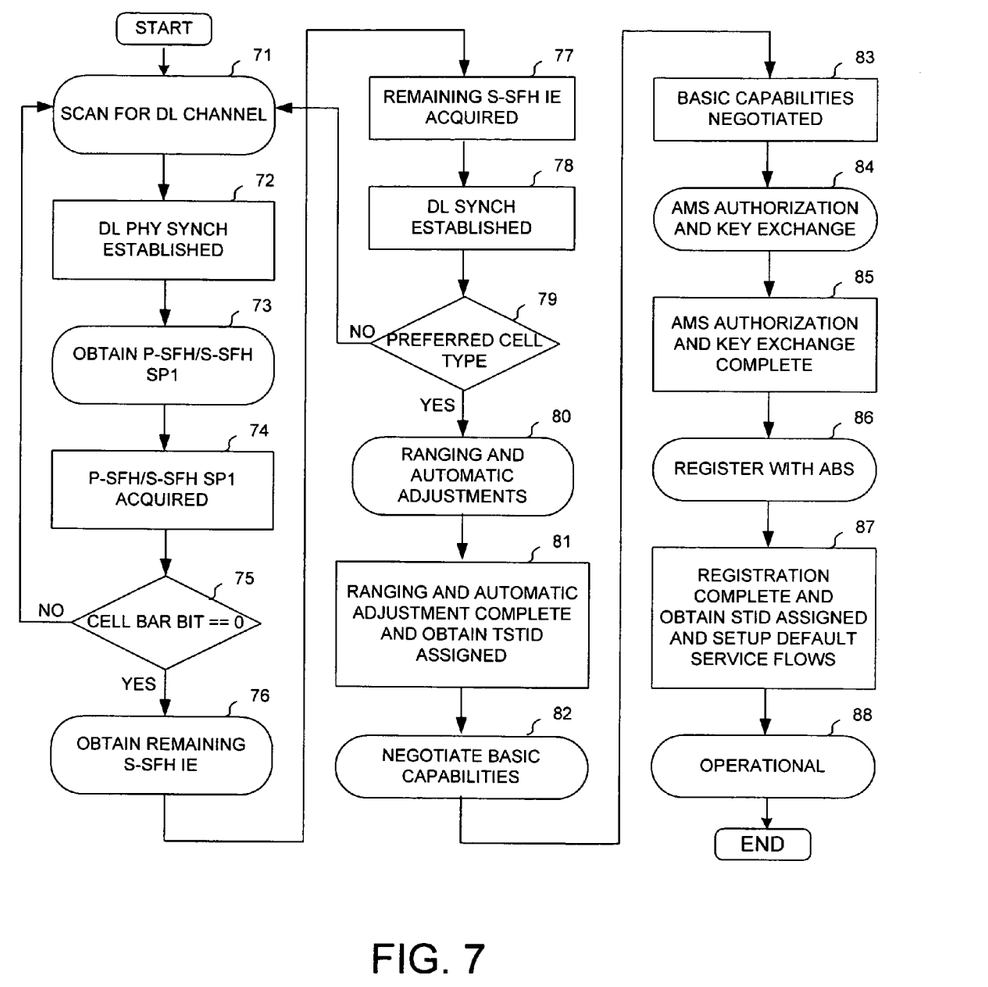
FIG. 7 is a detailed flow chart of mobile station initialization procedure in accordance with one novel aspect.

FIG. 7 is a detailed flow chart of a mobile station initialization procedure in accordance with one novel aspect. In step 71, the mobile station scans for DL channel upon power-on. In step 72, the mobile station performs DL PHY layer synchronization with a target base station. During DL PHY layer synchronization, the mobile station adjusts its timing, frequency and power via an SCH broadcasted by the target base station. The mobile station also receives a BCH broadcasted by the target base station. The BCH is conveyed in a format of Primary SFH and Secondary SFH. In steps 73-74, the mobile station obtains and acquires primary SFH (P-SFH) and secondary SFH SP1 information. In step 75, the mobile station checks whether a cell bar bit of the target base station is set to one. This is because the target base station may set its cell bar bit to one in order to prevent access during special operational mode (e.g., maintenance or testing mode). If the cell bar bit is set to zero, then the mobile station continues to obtain and acquire the remaining secondary SFH (S-SFH) information in steps 76 and 77. In step 78, DL PHY layer synchronization with the target base station is established. The mobile station then determines whether the cell type of the target base station is the one it intends to camp on (step 79). If not, then the mobile station goes back to step 71 and scans for other DL channels from other base stations. If yes, then the mobile station continues to acquire UL PHY layer synchronization with the target base station. During UL PHY layer synchronization, the mobile station performs ranging and automatic adjustment with the target base station in steps 80 and 81. After PHY layer synchronization, the mobile station then starts to acquire MAC layer synchronization via network entry procedure with the target base station. In steps 82 and 83, the mobile station negotiates basic capabilities with the target base station. In steps 84 and 85, authorization and key exchange with the target base station are completed. In steps 86 and 87, the mobile station registers with the target base station and sets up default service flows. Finally, in step 88, the target base station becomes the serving base station and the mobile station is operational.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   performing physical layer synchronization by a mobile station with a first base station in a wireless communication system;
   obtaining a cell identification (ID) of the first base station and cell ID partitioning information broadcasted by the first base station, wherein cell IDs are partitioned into multiple non-overlapping subsets for corresponding cell types, and wherein the cell ID partitioning information comprises one or more partition pointers, each partition pointer indicates a subset size of each corresponding cell type; and
   identifying a cell type of the first base station based on the cell ID and the cell ID partitioning information, wherein the mobile station completes ranging and network entry with the first base station if the cell type is preferred, and wherein the mobile station starts to perform physical layer synchronization with a second base station if the cell type is non-preferred.

2. The method of claim 1, wherein the cell ID is carried in a synchronization channel (SCH), and wherein the cell ID partitioning information is carried in a broadcast channel (BCH).

3. The method of claim 2, wherein the BCH is conveyed in a format of a super frame header (SFH).

4. The method of claim 2, wherein the BCH is conveyed in a format of a media access control (MAC) layer message.

5. The method of claim 2, wherein the mobile station decodes the SCH to derive the cell ID, and wherein the mobile station decodes the BCH to derive the cell ID partitioning information.

6. The method of claim 1, wherein each cell type is associated with a set of non-overlapping cell ID sequences such that the mobile station identifies the cell type of the base station by comparing the cell ID with each set of cell ID sequences.

7. The method of claim 1, further comprising:
   determining cell ID search range based on the cell type preference of the mobile station before performing synchronization with the second base station.

8. A method comprising:
  providing cell identification (ID) partitioning information in a broadcast channel (BCH) by a base station in a wireless communication system, wherein a set of cell identification sequences is partitioned into multiple non-overlapping subsets based on the cell identification partitioning information, wherein each subset is associated with a corresponding cell type in the wireless communication system, and wherein the cell ID partitioning information comprises one or more partition pointers, each partition pointer comprises information of a subset size of each corresponding cell type; and
  periodically broadcasting the BCH in the wireless communication system.

9. The method of claim 8, wherein the BCH is conveyed in a format of a super frame header (SFH).

10. The method of claim 8, wherein the BCH is conveyed in a format of a media access control (MAC) layer message.

11. The method of claim 8, wherein the partition pointer comprises a number of bits allocated in the BCH.

12. A method comprising:
  transmitting a cell identification (ID) sequence by a base station in a wireless communication system, wherein the cell ID sequence belongs to a first sequence set if the base station has a first cell type, and wherein the cell ID sequence belongs to a second sequence set if the base station has a cell type other than the first cell type;
  providing cell ID partitioning information in a broadcast channel (BCH) by the base station, wherein the second set of sequences is partitioned into multiple non-overlapping subsets based on the cell ID partitioning information, wherein each subset is associated with a corresponding cell type other than the first cell type, and wherein the cell ID partitioning information comprises one or more partition pointers, each partition pointer comprises information about a subset size of each corresponding cell type; and
  periodically broadcasting the BCH in the wireless communication system.

13. The method of claim 12, wherein the first cell type is macro base station, and wherein the first sequence set has a predefined size.

14. The method of claim 12, wherein the BCH is conveyed in a format of a super frame header (SFH).

15. The method of claim 12, wherein the BCH is conveyed in a format of a media access control (MAC) layer message.

16. The method of claim 12, wherein a first part of the cell ID partitioning information is provided by a super frame header (SFH), and wherein a second part of the cell ID partitioning information is provided by a media access control (MAC) layer message.

17. The method of claim 12, wherein each partition pointer comprises a number of bits allocated in the BCH.

\* \* \* \* \*